June 27, 1961  C. V. EVERETT ET AL  2,990,195
IMPLEMENT ATTACHING APPARATUS FOR TRACTORS
Filed Nov. 4, 1959  3 Sheets-Sheet 3
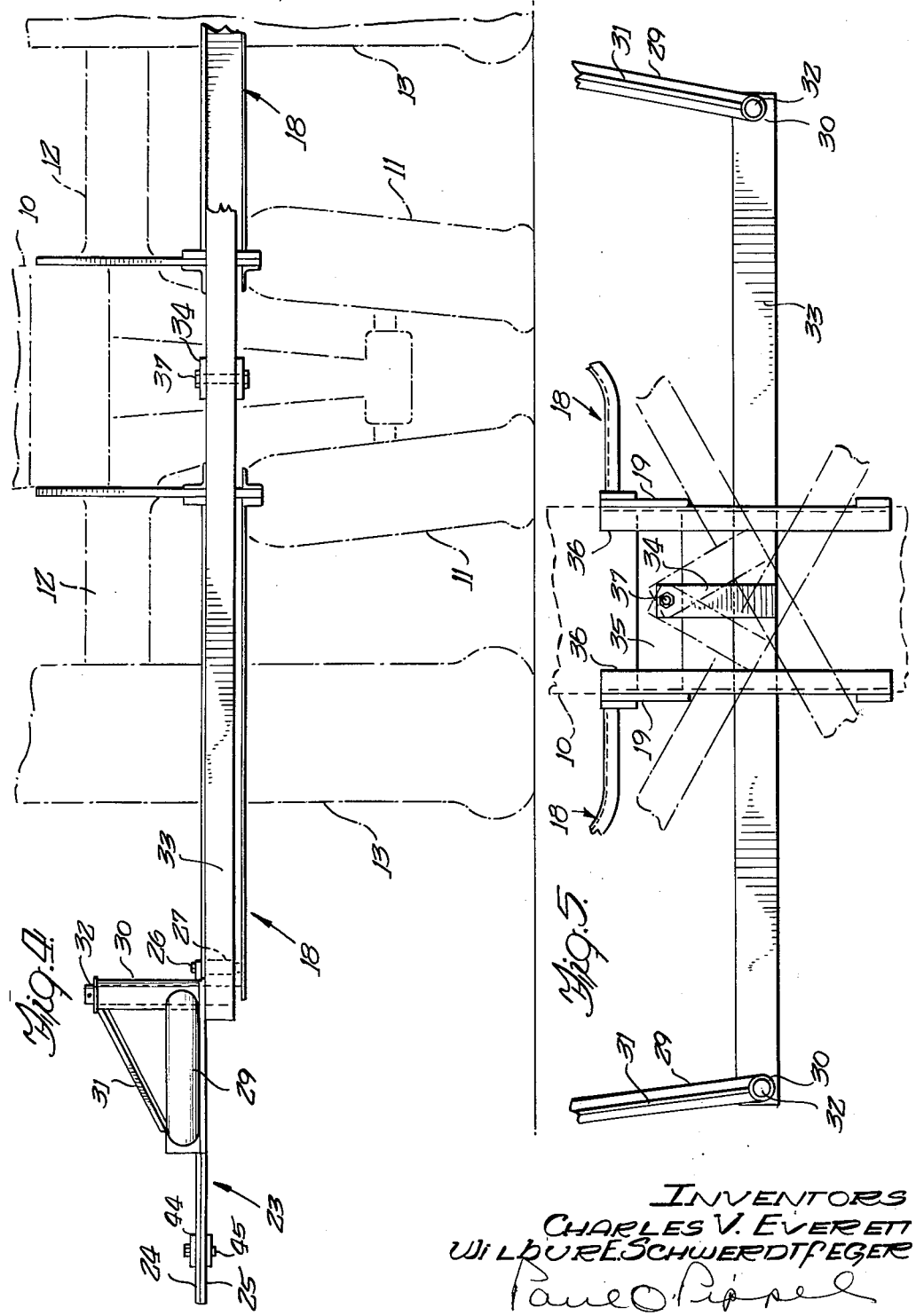
INVENTORS
CHARLES V. EVERETT
WILBUR E. SCHWERDTFEGER
ATTORNEY

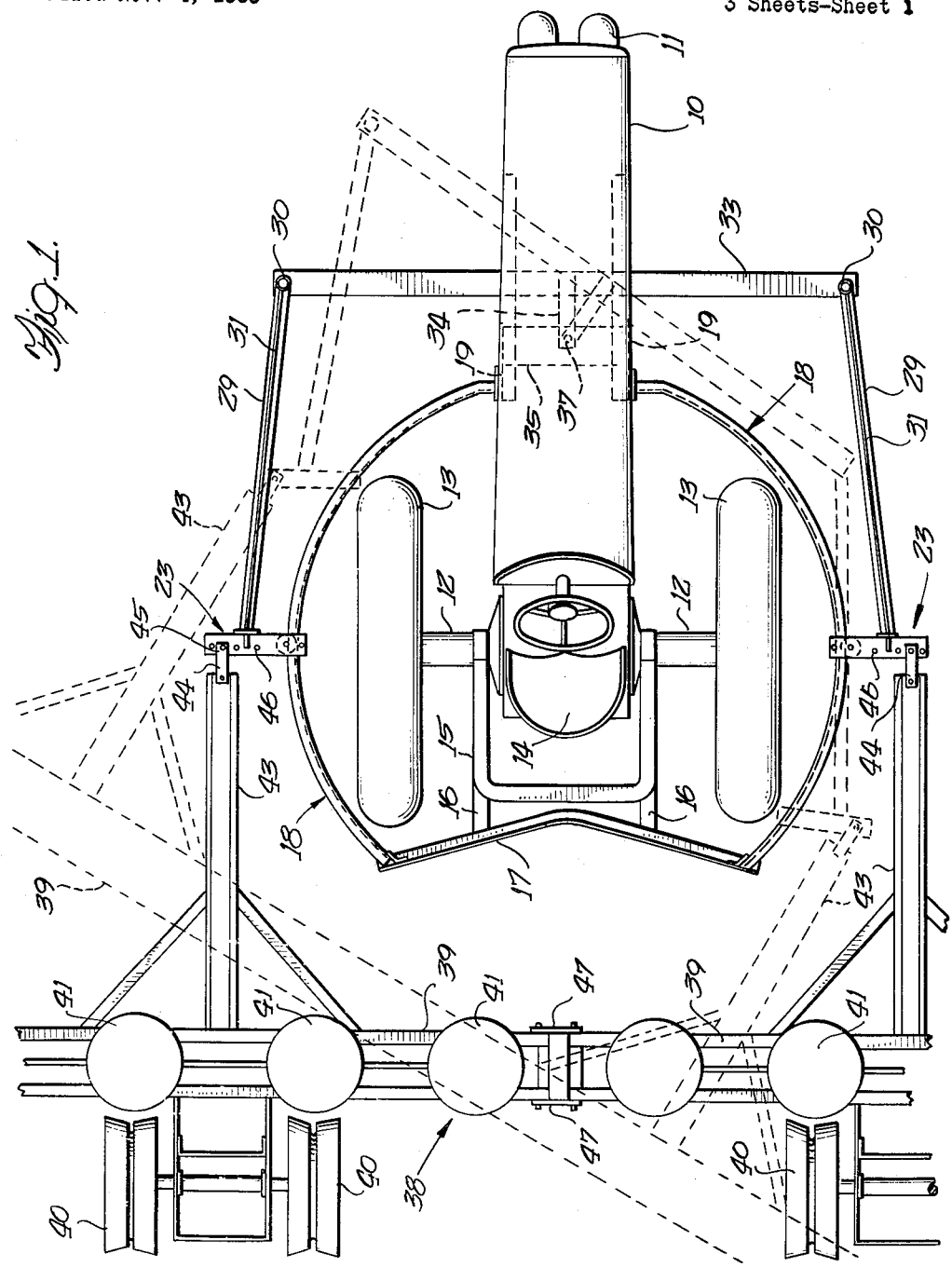

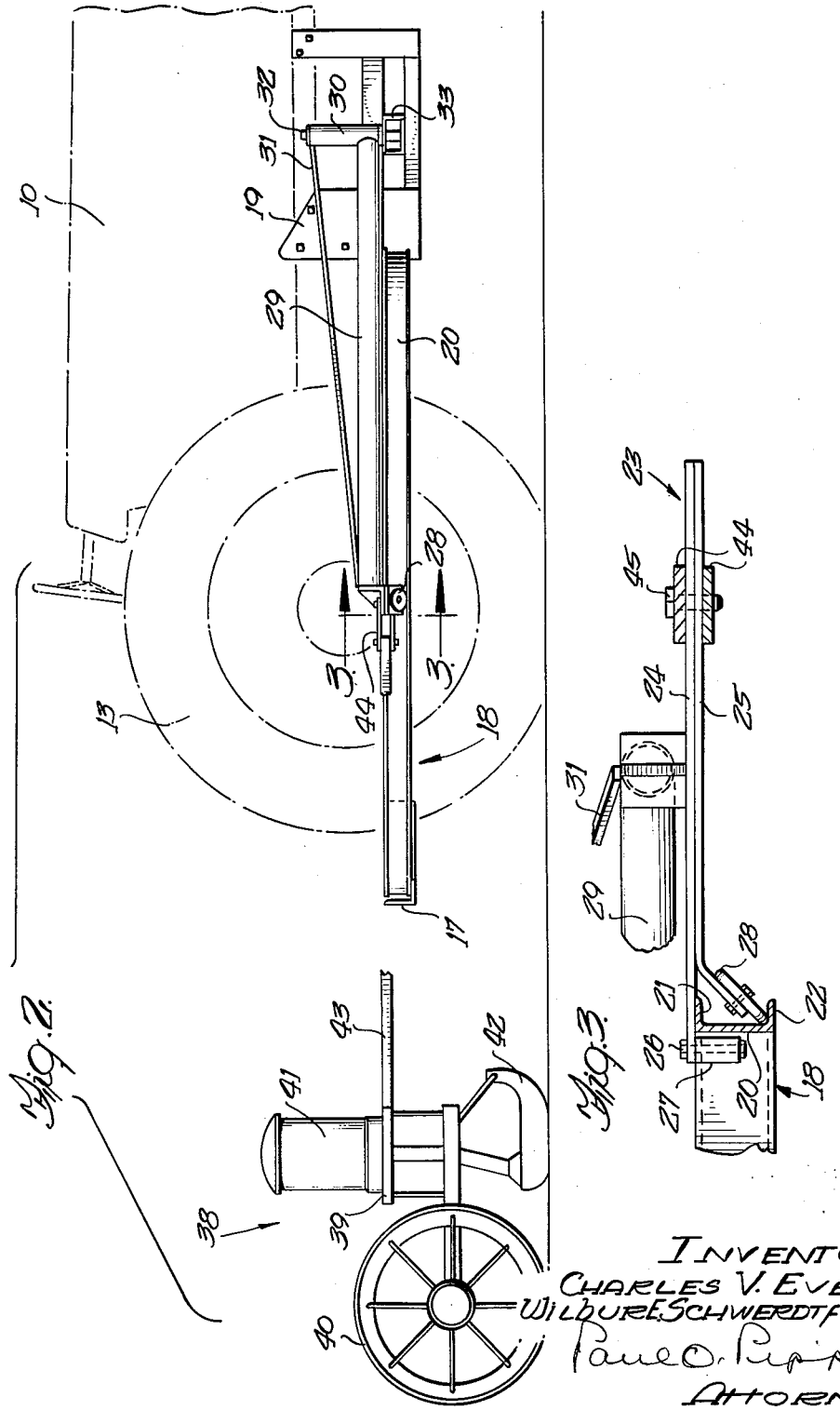

United States Patent Office 2,990,195
Patented June 27, 1961

2,990,195
IMPLEMENT ATTACHING APPARATUS FOR TRACTORS
Charles V. Everett, Warrenville, and Wilbur E. Schwerdtfeger, La Grange, Ill., assignors to International Harvester Company, Chicago, Ill., a corporation of New Jersey
Filed Nov. 4, 1959, Ser. No. 850,949
11 Claims. (Cl. 280—447)

This invention relates to agricultural implements and particularly to means for connecting an implement to a tractor. More specifically, the invention concerns improved means for the connection to the rear end of a tractor of a widespread implement, whereby the implement is caused to follow easily in the path of the tractor.

One of the problems encountered with widespread and squadron hitched implements such as planters, disk harrows and the like, has been the difficulty of controlling the implement when making short turns with the tractor, and it has been proposed to control such an implement by forming a semi-circular drawbar around the rear end of the tractor and hitching the implement to it by means allowing the implement to swing relative to the tractor in a fixed path about an axis disposed between the tractor rear wheels. Therefore, an object of this invention is the provision of an improved hitch structure for connecting an implement to a tractor wherein the implement is caused to follow closely in the path of travel of the tractor.

Another object of the invention is the provision of novel implement hitch means wherein the actual hitch point of the implement is between the front and rear wheels of the tractor.

Another object of the invention is the provision of improved hitch means for a widespread implement or pair of squadron connected implements, wherein the implement has a pair of hitch structures connected to opposite ends of an equalizer bar which, in turn, is pivotally connected to a tractor between the front and rear wheels, and wherein said hitch structures are slidably connected to semi-circular track means carried by the tractor defining an axis midway between the rear wheels and rearwardly of said hitch point.

Other objects and advantages of the invention will become clear from the following detailed description when read in conjunction with the acompanying drawings wherein:

FIGURE 1 is a plan view of an implement connected to a tractor by means incorporating the features of this invention;

FIGURE 2 is a side elevation on an enlarged scale of the implement and hitch structure of FIGURE 1, and indicating the rear end of the tractor;

FIGURE 3 is a section taken on the line 3—3 of FIGURE 2;

FIGURE 4 is a front elevation of the hitch structure of this invention; and

FIGURE 5 is a plan view on a smaller scale than FIGURE 4 of the forward portion of the implement attaching structure of this invention.

In the drawings, the numeral 10 designates the longitudinally extending body of a tractor having front wheels 11, rear axle supporting housings 12 and laterally spaced drive wheels 13. Also provided are an operator's station 14 and a rearwardly extending drawbar 15 affixed to the rear axle housings 12.

A pair of straps 16 secured to the drawbar 15, extend rearwardly therefrom and have affixed thereto a transversely extending angle bar 17 bent forwardly in the center and having its ends extending laterally and rearwardly.

The ends of bar 17 have secured thereto the rear ends of a pair of arcuately curved, channel-shaped guide rails or tracks 18, each of which curves outwardly and forwardly around the adjacent drive wheel 13, and has its forward end secured to a plate 19 affixed to the tractor body and depending therefrom. Each of the rails 18 comprises an upright portion 20 and outwardly projecting upper and lower flanges 21 and 22.

A laterally extending connecting member 23 includes a pair of bars or plates 24 and 25 secured together, the inner end of the upper bar 24 projecting inwardly of the channel-shaped track 18 and carrying at its inner end a depending bolt 26, upon which is mounted a roller 27 parallel to and adapted to engage the vertical portion 20 of the rail. The iner end of the lower bar or plate 25 is bent downwardly and inwardly and has rotatably mounted thereon a wheel 28 adapted to engage the channel at the juncture of the upright portion 20 and the lower flange 22.

The members 23, as well as the guide rails 18 on opposite sides of the tractor, are substantial duplicates and a description of one will suffice for both. The wheel 28 rides in the channel, receiving vertical support from the rail and being prevented from lateral displacement from flange 22 by engagement of roller 27 with the upright portion 20.

The members 23 are slidable independently on the associated tracks 18 in a longitudinal direction and in a generally circular path about an axis between the drive wheels 13. Each of the members 23 is affixed to the rear end of a draft bar 29, the forward end of which has secured thereto a vertically extending sleeve member 30 which extends upwardly from the draft bar 29 and has affixed to its upper end the forward end of a brace 31, the rear end of which is secured to the rear end of the draft bar.

Draft bars 29 converge forwardly as indicated in FIGURE 1, and each of the sleeve members 31 is adapted to rotatably receive a pivot pin 32, one of which is mounted at each end of a transversely extending drawbar 33. Drawbar 33 extends under the tractor body and has secured to the central portion thereof a rearwardly extending bracket 34, the forward end of which is pivotally connected to a hitching plate 35 connected to a pair of angle bars 36 secured to opposite sides of the tractor body.

As pointed out hereinbefore, each of the members 23 is capable of independent longitudinal sliding movement on the tracks 18, and this motion is transmitted through draft bars 29 to the drawbar 33, which pivots about the axis of a pivot pin or bolt 37 to a position such as is indicated in dotted lines in FIGURE 1.

Members 23 serve for the connection to the tractor of a transversely elongated implement such as the planting machine 38 indicated diagrammatically in FIGURES 1 and 2. It may be understood that the planter 38 includes transversely aligned frame sections 39 supported by laterally spaced pairs of ground-engaging wheels 40 and including a plurality of seed hoppers 41 and furrow openers 42. A pair of laterally spaced hitch structures 43 affixed to frame sections 39 extend forwardly therefrom and are pivotally connected by clevises 44 to the respective members 23 at opposite sides of the tractor. Each of the clevises 44 is mounted on a pivot bolt 45 adjustably receivable in one of a plurality of openings 46 provided in the bars 24 and 25 of the member 23.

By virtue of the connection of hitch structures 43 of the implement 38 to the members 23 and the connection of draft bars 29 to drawbar 33 under the tractor body, draft on the implement is taken through a hitch point well in advance of the drive wheels 13 of the tractor, the members 23 serving to guide the implement in a closely coupled tractor-implement relation, the parts assuming the dotted line position of FIGURE 1 when the tractor is turned to the left. The implement 38 shown in FIGURE 1 for the purposes of illustration is a planter comprising laterally spaced frame sections 39, the inner ends of which are flexibly connected by pivoted links 47 allowing some relative movement between the sections, but may, if desired, be a unitary, one-piece implement. Furthermore, other implements such as disk harrows and the like, are readily attachable to the tractor by the novel implement attaching apparatus described herein.

It should be understood that the invention has been described in its preferred embodiment only, and that modifications may be made therein without departing from the spirit of the invention or the scope of the appended claims.

What is claimed is:

1. Apparatus for the attachment to a tractor having a longitudinally extending body, steerable front wheels and laterally spaced rear drive wheels of a transversely elongated implement having a pair of hitch frames extending forwardly alongside and laterally outwardly of the respective of said drive wheels, comprising a drawbar extending transversely of the tractor body between the front and rear wheels thereof and pivotally connected thereto for rocking in a horizontal plane about a central vertical axis, a pair of draft bars pivotally connected at their forward ends to said drawbar and extending rearwardly therefrom, guide means carried by the tractor and extending forwardly and rearwardly thereof laterally outwardly of said drive wheels and having a sliding connection with said draft bars to accommodate the horizontal swinging of the latter, and means pivotally connecting said implement hitch frames to said draft bars.

2. Apparatus for the attachment to a tractor having a longitudinally extending body, steerable front wheels and laterally spaced rear drive wheels of a transversely elongated implement having a pair of hitch frames extending forwardly alongside and laterally outwardly of the respective of said drive wheels, comprising a drawbar extending transversely of the tractor body between the front and rear wheels thereof and pivotally connected thereto for rocking in a horizontal plane about a central vertical axis, a pair of draft bars pivotally connected at their forward ends to said drawbar and extending rearwardly therefrom, means pivotally connecting said implement hitch frames to the respective of said draft bars to accommodate swinging of the implement in a horizontal plane with said drawbar, and guide means carried by the tractor and extending forwardly and rearwardly thereof laterally outwardly of said drive wheels and having a sliding connection with said hitch frames.

3. Apparatus for the attachment to a tractor having a longitudinally extending body, steerable front wheels and laterally spaced rear drive wheels of a transversely elongated implement having a pair of hitch frames extending forwardly alongside and laterally outwardly of the respective of said drive wheels, comprising a drawbar extending transversely of the tractor body between the front and rear wheels thereof and pivotally connected thereto for rocking in a horizontal plane about a central vertical axis, means connecting said implement hitch frames to the respective ends of said drawbar to receive draft therefrom, guide means carried by the tractor and extending forwardly and rearwardly thereof laterally outwardly of said drive wheels, and means forming a slidable connection between said hitch frames and said guide means.

4. Apparatus for the attachment to a tractor having a longitudinally extending body, steerable front wheels and laterally spaced rear drive wheels of a transversely elongated implement having a pair of hitch frames extending forwardly alongside and laterally outwardly of the respective of said drive wheels, comprising a drawbar extending transversely of the tractor body between the front and rear wheels thereof and pivotally connected thereto for rocking in a horizontal plane about a central vertical axis, means connecting said implement hitch frames to the respective ends of said drawbar to receive draft therefrom, guide means carried by the tractor and extending forwardly and rearwardly thereof laterally outwardly of said drive wheels, and means forming a slidable connection between said hitch frames and said guide means, said guide means comprising a pair of arcuately shaped members extending around the outside of and partly encircling said wheels.

5. Apparatus for the attachment to a tractor having a longitudinally extending body, steerable front wheels and laterally spaced rear drive wheels of a transversely elongated implement having a pair of hitch frames extending forwardly alongside and laterally outwardly of the respective of said drive wheels, comprising a drawbar extending transversely of the tractor body between the front and rear wheels thereof and pivotally connected thereto for rocking in a horizontal plane about a central vertical axis, a pair of draft bars pivotally connected at their forward ends to said drawbar and extending rearwardly therefrom, guide means carried by the tractor and extending forwardly and rearwardly thereof laterally outwardly of said drive wheels and having a sliding connection with said draft bars to accommodate the horizontal swinging of the latter, and means pivotally connecting said implement hitch frames to said draft bars, comprising hitch plates to which said draft bars are connected, each said hitch plate having its inner end slidably connected to said guide means and extending laterally laterally therefrom, and means on said hitch plates accommodating connection of the associated implement hitch frame thereto at selected locations to accommodate implements having varied spacings between said hitch frames.

6. The invention set forth in claim 4, wherein the radii of said arcuately shaped guide members are such that said implement swings laterally, upon turning the tractor, about an axis substantially midway between said drive wheels.

7. The invention set forth in claim 4, wherein the tractor is provided with a rear draw frame, and wherein the rear ends of said arcuately shaped guide members are supported on said draw frame rearwardly of the tractor drive wheels and the forward ends thereof are secured to the sides of the tractor in advance of said drive wheels.

8. Apparatus for the attachment to a tractor having a longitudinally extending body and laterally spaced traction devices of a transversely elongated implement having a pair of hitch frames extending forwardly alongside and laterally outwardly of said traction devices, comprising guide means carried by the tractor, means slidably connecting said hitch frames to said guide means to accommodate sliding thereof in a generally circular path about an axis between said traction devices, means serving as a drawbar on the tractor in advance of said guide means, and means connecting said hitch frames to said drawbar means in draft-receiving relation, said drawbar means being mounted on the tractor for swinging movement in a horizontal plane to accommodate the sliding of said hitch frames with respect to said guide means.

9. The invention set forth in claim 8, wherein said guide means includes arcuately shaped horizontal sections extending around the outside of said traction devices adapted to accommodate lateral swinging of the implement relative to the tractor about an axis between said traction devices.

10. The invention set forth in claim 8, wherein the means connecting each of said hitch frames to said drawbar means is an elongated draft bar operatively connected at its rear end to the associated hitch frame and at its forward end to the drawbar means.

11. The invention set forth in claim 9, wherein the means slidably connecting each hitch frame to the guide means is a bar having its inner end slidably connected to the guide means and extending laterally outwardly therefrom, said bar having means thereon for the connection of the associated hitch frame thereto at selected locations to accommodate hitch frames having different spacings therebetween.

References Cited in the file of this patent

UNITED STATES PATENTS

| | | |
|---|---|---|
| 1,353,620 | Zinser | Sept. 21, 1920 |
| 1,416,989 | Silva | May 23, 1922 |
| 2,001,408 | Burton | May 14, 1935 |
| 2,062,282 | Acton | Dec. 1, 1936 |
| 2,077,942 | Lingren | Apr. 20, 1937 |
| 2,224,091 | Vallance | Dec. 3, 1940 |

FOREIGN PATENTS

| | | |
|---|---|---|
| 108,534 | Australia | Sept. 28, 1939 |